United States Patent [19]
Hower et al.

[11] Patent Number: 5,662,293
[45] Date of Patent: Sep. 2, 1997

[54] POLYIMIDE FOAM-CONTAINING RADOMES

[76] Inventors: R. Thomas Hower; Stephen V. Hoang, both of c/o Marion Composites, 150 Johnston Rd., Marion, Va. 24354-3121

[21] Appl. No.: 435,171

[22] Filed: May 5, 1995

[51] Int. Cl.⁶ .................................................. B64C 1/00
[52] U.S. Cl. .................................. 244/133; 244/121
[58] Field of Search .................................. 244/133, 121; 343/708, 705

[56] References Cited

U.S. PATENT DOCUMENTS

| | | | |
|---|---|---|---|
| 2,167,972 | 8/1939 | Crawford | 244/133 |
| 2,614,059 | 10/1952 | Cooper . | |
| 2,728,702 | 12/1955 | Simon et al. | 244/133 |
| 3,063,654 | 11/1962 | Youngren et al. . | |
| 3,292,544 | 12/1966 | Caldwell et al. . | |
| 3,396,396 | 8/1968 | Charlton et al. | 343/708 |
| 3,637,166 | 1/1972 | Nicholson et al. | 244/121 |
| 3,713,961 | 1/1973 | Copeland et al. . | |
| 4,776,903 | 10/1988 | Nordskog . | |
| 4,896,164 | 1/1990 | Burke et al. . | |
| 4,943,594 | 7/1990 | Ezawa et al. . | |
| 5,323,170 | 6/1994 | Lang | 343/705 |
| 5,413,847 | 5/1995 | Kishi et al. . | |
| 5,429,326 | 7/1995 | Garesché et al. | 244/133 |

OTHER PUBLICATIONS

Donald J. Baker, Oct. 13–16, 1986 New Materials in Civil Aviation.
Aviation Week, Foam Plastic Is Lightweight Stiffener Oct. 27, 1952.

Primary Examiner—Andres Kashnikow
Assistant Examiner—Tien Dinh
Attorney, Agent, or Firm—Wood, Phillips, VanSanten, Clark & Mortimer

[57] ABSTRACT

A radome for protecting electromagnetic equipment includes a polyimide foam that preferably is a closed cell foam. The polyimide foam imparts improved impact and moisture resistance to the radome without adversely affecting electromagnetic transmission thereof.

15 Claims, 2 Drawing Sheets

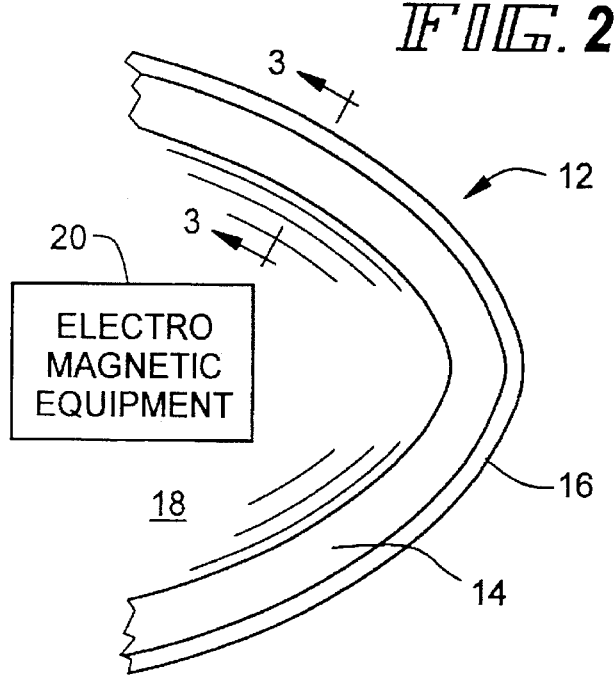
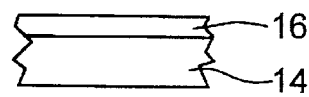
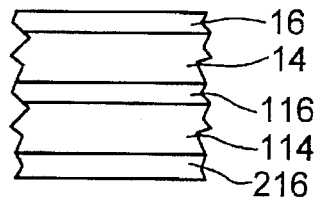
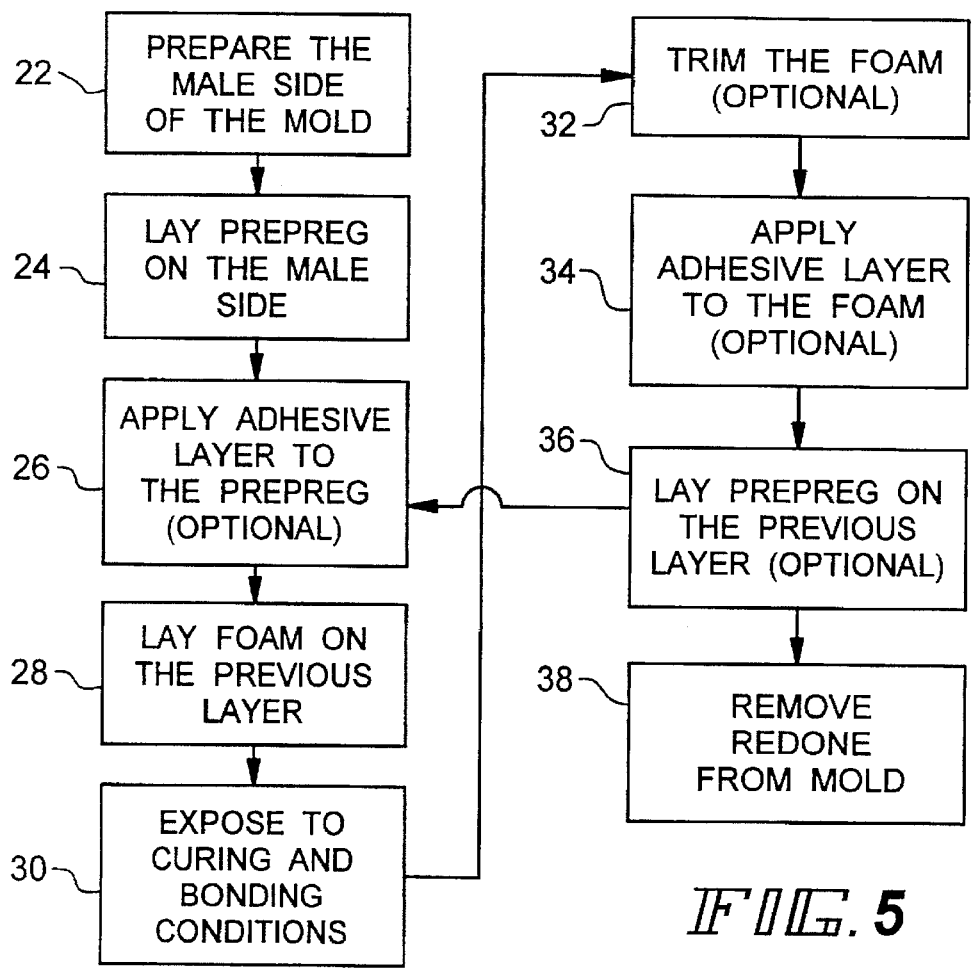

POLYIMIDE FOAM-CONTAINING RADOMES

TECHNICAL FIELD

This invention generally relates to radomes. More particularly, the invention relates to polyimide foam-containing radomes.

BACKGROUND OF THE INVENTION

The word "radome" dates back to World War II and is derived from the words 'radar' and 'dome'. Originally, radome referred to radar transparent, dome-shaped structures used to protect radar antennas on aircraft. Over time, radome has come to mean almost any structure that protects a device, such as a radar antenna, that sends or receives electromagnetic radiation, such as that generated by radar, and which is substantially transparent to the electromagnetic radiation. The structure may be flat rather than dome-shaped and may be on an aircraft, the ground or a ship.

The term "radome", as used herein in its various grammatical forms, identifies any structure used to protect electromagnetic radiation equipment, e.g., radar equipment, that is aircraft, ground or ship based, unless a specific radome, e.g., or a nose radome of an aircraft, is identified.

A radome is an integral part of a radar system because the thickness of the radome and its properties affect the effectiveness of the radar and must be compatible with the specific properties of the radar set. Major design criteria of a radome include electromagnetic radiation transparency, structural integrity, environmental protection (e.g., protection from rain erosion and lightening strikes) and, especially for aircraft, an aerodynamic shape, and light weight. Economics also require that the cost should be as low as possible and the service life as long as possible. Successful radome design must balance all of the conflicting requirements. For example, the ideal shape of a nose radome for an aircraft from a electromagnetic radiation standpoint is hemispherical and as large as the aircraft will allow. A better aerodynamic shape, however, is ogival. A thick radome wall would have structural benefits, yet for optimum electromagnetic transmission the wall thickness must be chose as a factor of the radar wavelength. A thin, lightweight design may improve aircraft performance, save fuel, and reduce material cost but at the expense of decreased service life, increased maintenance costs, and/or increased product costs. Clearly, trade offs must be made.

Currently, a common type of radome is one having a fiberglass reinforced honeycomb core sandwich construction. The honeycomb core has an open-cell structure which encourages moisture intrusion that, as discussed below, can destroy the radome, and it has relatively poor impact resistance.

Static properties, finite element analysis (FEA), and testing traditionally have led aircraft designers to select the honeycomb core to construct the "best" radome. Although "best" is often defined as the lightest, stiffest and strongest core having the required electromagnetic properties, this approach is often inadequate, especially in impact/moisture critical environments, such as nose radomes and ship borne radomes. Radome repair data accumulated by the United States Federal Aviation Administration (FAA) indicates that about 85% of all honeycomb radomes are removed for moisture damage, and most air carriers confirm that their mean-time-between failures is substantially less than two years for some honeycomb radomes. Consequently, high maintenance costs, high inventory and questionable radar performance (due to moisture) occur.

Radomes fail when subjected to severe structural damage or degradation of electromagnetic radiation transmission. There are numerous ways for failure to occur in the hostile environment in which radomes must operate. Lightning strikes can cause microscopic pinholes or microcracks in a protective skin that covers the core. Static electricity on the outer surface of the radome can arc between the outer surface and the antenna or another electrically conductive surface to burn through the radome. Static burns are small, about the size of a pinhole or microcrack. High velocity rain or hail can cause core impact failure or "soft spots" in the radome which promote microcracking. Pinholes and microcracks are paths for moisture to enter the radome core. Rain or moisture causes further damage as it penetrates into the core through the pinholes or microcracks. During the flight of an aircraft, dynamic wind pressure pumps water through the pinholes or microcracks and deeper into the core.

Moisture in the core causes severe problems, especially if altitude or temperature changes result in multiple freeze/thaw cycles. The volume of the water expands by about 10% when it freezes causing it to exert a force against the core and skin. Repetitive freezing and thawing results in delamination, cracking and the like in the core that result in additional moisture paths and, if severe enough, radome failure. Water and ice are also detrimental to electromagnetic radiation transmission as their dielectric constant is on the order of 20 times greater than that of most materials used for sandwich construction radomes.

Another common type of radome used in aircrafts is the fluted core radome which was adopted to combat the moisture problem associated with the honeycomb core radome. The fluted core is a series of square fiberglass tubes. Hot air is blown into the tubes to deice the radome and blow water away from the region of the radome where electromagnetic transmission is critical. The fluted core has an undesirably high density (approximately 200 kg/m$^3$), which is over twice as dense as other radome core materials. A fluted core radome also weighs approximately 30% more than its honeycomb counterpart. The construction of a fluted core radome is very labor intensive, which leads to an expensive finished product. Furthermore, repairs are expensive and time consuming. These disadvantages are not acceptable to many radome users, especially since fluted core radomes eventually retain moisture in any event.

Yet another type of radome is the foam core radome. Radomes that used foamed in place polyurethane foam were popular in the 1950's, but the foam's tendency to crumble and poor fatigue and impact properties quickly gave "foam radomes" an unfavorable name. Other foams that allegedly are closed-cell (i.e. polymethacrylimide foam) actually have poor moisture absorption properties. This history of poor "foam radome" performance has hindered the development of other radomes using a better suited foam.

The use of a syntactic foam, i.e., foam containing glass microballons, in radomes is limited because the syntactic foam radomes are heavier than honeycomb radomes.

A radome that overcomes one or more of the aforementioned shortcomings is high desirable.

SUMMARY OF THE INVENTION

A radome of the present invention includes a polyimide foam that is preferably a closed-cell foam. The radome has a layer of the polyimide foam with a skin adjacent thereto to form a laminate structure.

Improved radomes that are less susceptible to moisture damage, are light weight and have good impact resistance are produced using the polyimide foam.

BRIEF DESCRIPTION OF THE DRAWINGS

FIG. 2 is a fragmentary cross-sectional view of the radome;

FIG. 3 is a fragmentary cross-sectional view of the radome taken along line 3—3 of FIG. 2;

FIG. 4 is a fragmentary cross-sectional view of an alternative radome having two lagers of polyimide foam; and FIG. 5 is a flow chart of a representative process for making the radome.

DETAILED DESCRIPTION OF THE PREFERRED EMBODIMENT

Figure 1:
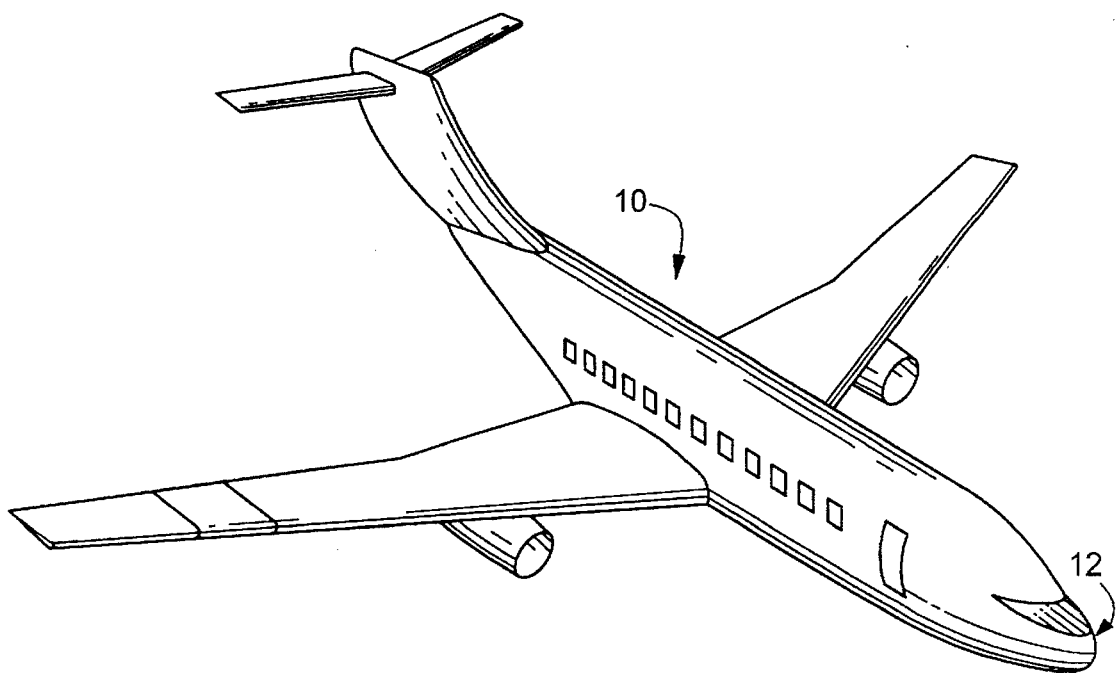
FIG. 1 illustrates a radome of the present invention in a representative environment.

Although this invention is susceptible to embodiment in many different forms, there are described in detail herein, presently preferred embodiments of the invention. It should be understood, however, that the present disclosure is to be considered as an exemplification of the principles of this invention and is not intended to limit the invention to the embodiments described.

FIG. 1 illustrates a representative environment, shown generally as an aircraft 10, for a radome 12 of the present invention. The radome 12 is a nose radome positioned at the front of the aircraft 10. It should be understood that the present invention is also suitable for use as a radome in other environments such as ground based and ship based radar systems and that the radome is not necessarily a dome-shaped structure. It should also be understood that the radome is suitable for use with electromagnetic equipment in addition to radar.

FIG. 2 illustrates the radome 12 which is made of polyimide foam, that preferably is a layer 14, covered with a skin 16. The polyimide foam layer 14 is the core of the radome 12. The radome 12 defines a cavity 18 that receives and protects electromagnetic equipment 20. An antenna for radar is a representative piece of electromagnetic equipment.

FIG. 3 illustrates a cross section of the radome taken along line 3—3 of FIG. 2. The skin 16 is on an exterior surface of the polyimide foam 14.

In the embodiment illustrated in FIG. 4, the radome is a laminate made of two polyimide foam layers 14, 114 with skins 16, 116, 216 sandwiching adjacent polyimide foam layers 14, 114 therebetween.

The polyimide foam is rigid or semi-rigid and preferably is a closed-cell foam. In a closed-cell foam, each cell is entirely surrounded by a cell wall which inhibits the flow of fluids through the foam. In contrast, an open cell foam has individual cells are not completely surrounded by cell walls and fluid may pass between adjacent cells.

The cells of the polyimide foam preferably have a diameter in the range of about 0.5 to about 1 millimeters.

The density of the polyimide foam is preferably in the range of about 75 to about 85 kilograms per cubic meter.

The polyimide foam has a relatively high glass transition temperature which makes it well suited for high temperature applications such as those generated by high performance military aircraft. Preferably, the glass transition temperature is at least about 350° F.

The impact resistance of the polyimide foam is preferably in the range of about 1 to about 2 kilojoules per square meter.

The average dielectric constant is less than 1.4. The loss tangent is less than 0.02, preferably less than 0.007.

The polyimide foam is prepared by a conventional synthesis that, for example, reacts aromatic diamine functionality with an aromatic carboxylic acid functionality. Alternatively, the aromatic carboxylic acid functionality can be in its ester or anhydride form. When the polyimide is a polyetherimide, the foam is produced by a nucleophilic reaction between a phenolic salt functional group and a halo and/or nitro functionality. Polyimides and their synthesis are discussed in *Polyimides*, Edited by D. Wilson et al, published in the United States by Chapman & Hall, New York, N.Y., 1990, which is incorporated herein by reference.

Thermoset and thermoplastic polyimide foams are believed to be useful herein. Representative polyimide foams include the thermoset polyimide foams bismaleimides, acetylene-terminated polyimides, benzocyclobutene-terminated polyimides, poly-bis (allylnadic)imides and PMR-polyimides and the thermoplastic polyimide foams Skybond/Pyralin class (developers include Monsanto and DuPont), Avimid class (developed by DuPont), fluorinated polyimides (developers include TRW and Ethyl Corp.), LaRC-TPI (developed by NASA), Matrimid class (developed by Ciba-Geigy), polyetherimides (Ultem from General Electric), polyamideimides (Torlon developed by Amoco). Similar polyimide foams and mixtures of polyimide foams are also suitable. A preferred polyimide foam is the polyetherimide foam. A commercially available polyetherimide foam is R82.80 from Airex AG, Switzerland.

To achieve the desired shape of the radome, the polyimide foam is premade, e.g., in sheet form, and then formed into shape, as by thermoforming, during radome production. Alternatively, the polyimide foam is produced in-situ as by injection molding or spraying during radome production.

The skin(s) is conventional. Suitable skins are composites of a polymer and fiber reinforcement, e.g., a prepreg. A prepreg is a fiber reinforced mat, e.g., a fiberglass mat, preimpregnated with a polymer, e.g., an epoxy, that cures or hardens. One or more prepregs are used to make the skin. The orientation of the fibers of successive layers of the prepreg are arranged to optimize the mechanical properties of the radome.

Representative of the prepreg are conventional cyanate ester/epoxy fiberglass prepregs, 5575-2 cyanate ester resin/ 4581 Astroquartz III commercially available from Cytec, Anaheim, Calif., 7701 epoxy resin/7781 glass, commercially available from ICI Fiberite, and the like.

To facilitate bonding of the skin and polyimide foam, an optional adhesive layer is positioned therebetween. The adhesive is compatible with the resin of the prepreg and often is the same resin. Under pressure and elevated temperature, the adhesive permeates into the top layer of the foam to enhance bonding. The adhesive is optional when the prepreg contains sufficient resin to permeate into the foam.

Representative of the adhesive are AF143-2 epoxy adhesive commercially available from 3M, Minneapolis, Minn., M2555 cyanate ester adhesive commercially available from Cytec and the like.

FIG. 5 is a block diagram illustrating a preferred process for manufacturing radomes of the present invention. In the first block 22, the male side of the mold is prepared prior to laying one or more prepregs on the male side (block 24). An optional adhesive layer is applied to the prepreg (block 26)

prior to laying the polyimide foam layer on the previous layer (block 28) of prepreg or adhesive. The prepreg, adhesive (if present) and foam are subjected to curing and bonding conditions (block 30). These conditions include pulling a vacuum and exposure to elevated temperatures. To compensate for the shrinkage the foam can experience during curing and bonding, the foam layer applied in the step of block 28 can be thicker than necessary for the radome. If the foam layer even after shrinkage is too thick, it is trimmed to the proper thickness (block 32).

The following steps are optional and are only used if the radome is to have multiple skins or polyimide foam layers, otherwise, the radome is removed from the mold (block 38). An optional adhesive layer is applied to the polyimide foam (block 34) prior to an optional prepreg being laid on the previous layer (block 36). The steps represented by blocks 26–36 are repeated as necessary to build up the desired number of layers of the radome. When complete, the radome is removed from the mold (block 38).

The following example is provided by way of illustration, and not limitation.

EXAMPLE

A radome of the present invention was prepared according to the following procedure.

A male side of a mold was sanded smooth and conventionally prepared. A pin router was used to machine the 0.5 inch thick polyetherimide foam panel commercially available from Airex under the designation R82.80 to a thickness of 0.18 inches. Enough foam was cut to form two new pieces having the same shape as a form used to estimate the area where the lay up on the mold will take place. Two sheets of the polyetherimide foam were formed into shape with one sheet to be used to make the inner core and the other the outer core of a C-sandwich. Four layers of a cyanate ester/epoxy prepreg were laid up using a 0°/90°/90°/0° fiber orientation pattern. That is, the first and fourth layers had the same orientation, the middle second and third layers had the same orientation, and the second and third layers were rotated 90° from the orientation of the first and second layers. Vacuum debulking was used as necessary. A layer of AF143-2 adhesive commercially available from 3M was applied to the prepreg layers. The prepregs and adhesive layer were then vacuum debulked. One of the formed polyetherimide foam sheets was then laid in position. The mold, prepreg layers, adhesive layer and polyetherimide foam layer were bagged with no bleeding followed by curing in an autoclave at a temperature of 350° F.±10° F. using a temperature ramp rate of about 5° to about 10° F. per minute, a pressure of 20±5 pounds per square inch and full vacuum within the bag for a time period of about three hours once the cure temperature was reached. Cool down was performed at the rates of about 5° to about 10° F. per minute. The pressure and vacuum were not released until the temperature reached ambient, about 75° F. Then, one layer of the AF143-2 adhesive was applied followed by vacuum debulk. Ten layers of the cyanate ester/epoxy prepreg were laid thereon using a +45°/−45°/0°/90°/0°/0°/90°/0°/−45°/+45° pattern with a vacuum debulk being performed after every three layers. A layer of the AF143-2 adhesive was then applied followed by vacuum debulk. The second formed sheet of the polyetherimide foam was then applied. Curing was then performed using the above-described conditions and procedure. Then, a layer of the AF143-2 adhesive was applied followed by vacuum debulk. Three layers of the cyanate ester/epoxy prepreg were laid thereon using a 0°/90°/0° pattern followed by vacuum debulking. Cure was then effected using the above-identified conditions.

A radome of the present invention was then removed from the mold.

Radomes of the present invention are sufficiently strong to protect electromagnet equipment contained therein yet are substantially transparent to electromagnet radiation. The closed cells inhibit penetration of water into the polyimide foam/core to lessen the problems associated with water that penetrates a core. The high impact resistance of the polyimide foam enhances the ability of the radome to withstand impacts and maintain structural integrity. Further, the high impact resistance lessens the likelihood that moisture pathways will be produced upon impact.

We claim:

1. In a radome suitable for protecting electromagnetic equipment, the improvement comprising a closed cell thermoplastic polyimide foam which is moisture impervious and substantially transparent to electromagnetic radiation.

2. The radome of claim 1 wherein the thermoplastic polyimide foam is selected from the group consisting of Skybond/Pyralin class, Avimid class, fluorinated polyimides, LaRC-TPI, Matrimid class, polyetherimides and polyamideimides.

3. The radome of claim 1 further comprising a skin adjacent the thermoplastic polyimide foam.

4. The radome of claim 1 where the closed cells of the thermoplastic polyimide foam have a diameter in the range of about 0.5 to about 1 millimeters.

5. The radome of claim 1 wherein the thermoplastic polyimide foam has a glass transition temperature of at least about 177° C.

6. The radome of claim 5 wherein the thermoplastic polyimide foam has an impact resistance in the range of about 1 to about 2 kilojoules per meter squared.

7. A radome suitable for protecting electromagnetic equipment and moisture impervious, the radome comprising a closed cell thermoplastic polyimide foam, the closed cell thermoplastic polyimide foam selected from the group consisting of Skybond/Pyralin class, Avimid class, fluorinated polyimides, LaRC-TPI, Matrimid class, polyetherimides and polyamideimides.

8. The radome of claim 7 further comprising a skin adjacent to the thermoplastic polyimide foam.

9. The radome of claim 7 wherein the thermoplastic polyimide foam is a layer of thermoplastic polyimide foam and the radome further comprises a skin bonded to the thermoplastic polyimide foam.

10. The radome of claim 9 wherein the thermoplastic polyimide foam is at least partially impregnated with adhesive to bond the thermoplastic polyimide foam and skin.

11. The radome of claim 9 further comprising a second skin adjacent to the thermoplastic polyimide foam.

12. The radome of claim 7 wherein the thermoplastic polyimide foam is at least two layers of thermoplastic polyimide foam.

13. The radome of claim 12 further comprising at least one skin between adjacent thermoplastic polyimide foam layers.

14. The radome of claim 13 wherein the one of the thermoplastic polyimide foam layers is bonded to the skin prior to the other of the thermoplastic polyimide foam layers.

15. The radome of claim 7 wherein the thermoplastic polyimide foam is a semi-rigid or rigid foam.

* * * * *

(12) EX PARTE REEXAMINATION CERTIFICATE (6309th)
United States Patent
Hower et al.

(10) Number: US 5,662,293 C1
(45) Certificate Issued: Jul. 22, 2008

(54) POLYIMIDE FOAM-CONTAINING RADOMES

(75) Inventors: R. Thomas Hower, Marion, VA (US); Stephen V. Hoang, Marion, VA (US)

(73) Assignee: Advanced Technical Products, Inc., Roswell, GA (US)

Reexamination Request:
No. 90/008,118, Oct. 26, 2006

Reexamination Certificate for:
Patent No.: 5,662,293
Issued: Sep. 2, 1997
Appl. No.: 08/435,171
Filed: May 5, 1995

(51) Int. Cl.
*B64C 1/00* (2006.01)

(52) U.S. Cl. .................................... 244/133; 244/121
(58) Field of Classification Search ............ 244/133, 244/121; 343/705, 706
See application file for complete search history.

(56) References Cited

U.S. PATENT DOCUMENTS

| | | | |
|---|---|---|---|
| 3,002,190 A | * | 9/1961 | Oleesky et al. ............. 343/907 |
| 3,644,168 A | | 2/1972 | Bonk et al. |
| 3,713,961 A | | 1/1973 | Copeland et al. |
| 4,084,161 A | | 4/1978 | Manning et al. |
| 4,576,859 A | | 3/1986 | Oyachi et al. |
| 4,896,164 A | | 1/1990 | Burke et al. |
| 4,980,102 A | | 12/1990 | Hill |
| 5,126,705 A | | 6/1992 | Carnevali et al. |
| 5,135,959 A | | 8/1992 | Hill |
| 5,192,810 A | | 3/1993 | Hill |
| 5,202,701 A | | 4/1993 | Casey |
| 5,338,826 A | | 8/1994 | St. Clair et al. |
| 5,429,326 A | | 7/1995 | Garescheet al. |
| 5,486,399 A | * | 1/1996 | Brydon et al. ............. 428/99 |
| 6,037,023 A | * | 3/2000 | Purinton et al. ........... 428/34.5 |

FOREIGN PATENT DOCUMENTS

EP 515 838 A1 12/1992

OTHER PUBLICATIONS

Airex Data Sheet, Published Feb. 2005, High Performance Foam R82.*
Airex R 82 high performance foam (preliminary data sheet), Airex AG Specialty Foams, Sins, Switzerland, Mar. 1994.
Airex® R82 High Performance Foam (Data Sheet/ Issue Feb. 2005 / Replaces Issue Nov. 2003), Alcan Airex AG, Sins, Switzerland.

* cited by examiner

*Primary Examiner*—Matthew C. Graham

(57) ABSTRACT

A radome for protecting electromagnetic equipment includes a polyimide foam that preferably is a closed cell foam. The polyimide foam imparts improved impact and moisture resistance to the radome without adversely affecting electromagnetic transmission thereof.

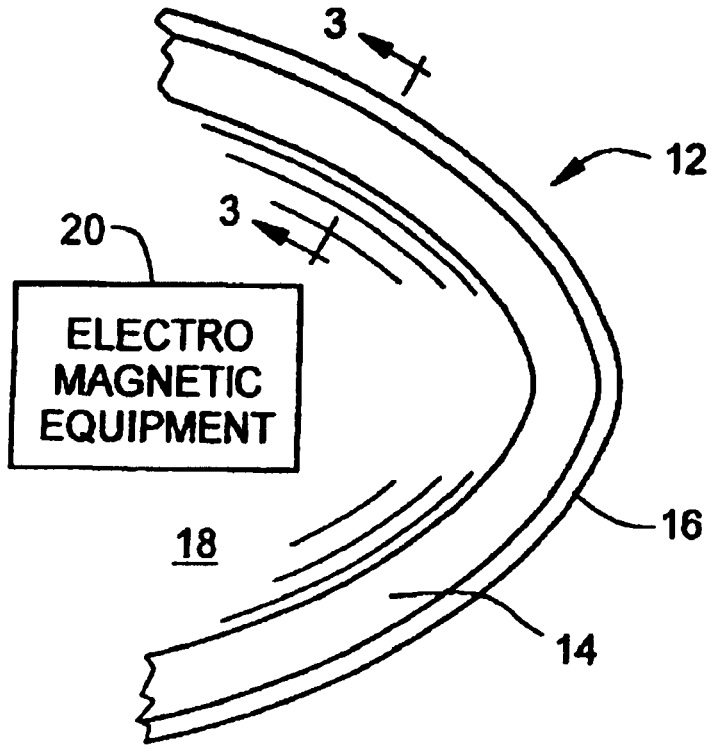

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–15 are cancelled.

* * * * *